(12) United States Patent
Grek et al.

(10) Patent No.: US 7,744,274 B1
(45) Date of Patent: Jun. 29, 2010

(54) METHODS AND APPARATUS FOR TEMPERATURE MEASUREMENT AND CONTROL ON A REMOTE SUBSTRATE SURFACE

(75) Inventors: Boris Grek, Hayward, CA (US); Michael Weitzel, San Jose, CA (US); David A. Markle, Saratoga, CA (US)

(73) Assignee: Ultratech, Inc., San Jose, CA (US)

(*) Notice: Subject to any disclaimer, the term of this patent is extended or adjusted under 35 U.S.C. 154(b) by 395 days.

(21) Appl. No.: 11/820,558

(22) Filed: Jun. 20, 2007

(51) Int. Cl.
G01J 1/00 (2006.01)
G01J 1/08 (2006.01)

(52) U.S. Cl. .................. 374/124; 374/167; 374/141; 438/308

(58) Field of Classification Search ........... 374/121, 374/120, 129, 1, 2, 163, 183, 185, 179, 141, 374/166, 167; 438/14, 795, 166, 799, 798, 438/308, 486, 487; 118/666, 724; 219/121.74, 219/121.65, 411, 405; 250/338.1, 340, 227.11, 250/214
See application file for complete search history.

(56) References Cited

U.S. PATENT DOCUMENTS

| 5,235,399 | A | * | 8/1993 | Usui et al. ............... 356/45 |
| 5,249,865 | A | * | 10/1993 | Paranjpe et al. ............ 374/161 |
| 5,772,323 | A | | 6/1998 | Felice ..................... 374/127 |
| 6,222,454 | B1 | | 4/2001 | Harling et al. ............ 340/584 |
| 6,747,245 | B2 | | 6/2004 | Talwar et al. ............ 219/121.8 |
| 6,943,086 | B2 | * | 9/2005 | Hongo et al. ............. 438/308 |
| 7,145,655 | B2 | * | 12/2006 | Zhu ..................... 356/369 |
| 7,148,159 | B2 | * | 12/2006 | Talwar et al. ............ 438/795 |
| 7,269,343 | B2 | * | 9/2007 | Koren et al. ............. 392/416 |
| 7,494,942 | B2 | * | 2/2009 | Talwar et al. ............ 438/795 |
| 2005/0067384 | A1 | * | 3/2005 | Talwar et al. ............ 219/121.6 |
| 2005/0103998 | A1 | * | 5/2005 | Talwar et al. ............ 250/340 |
| 2005/0189329 | A1 | * | 9/2005 | Talwar et al. .......... 219/121.65 |
| 2006/0252282 | A1 | * | 11/2006 | Talwar et al. ............ 438/795 |
| 2006/0255017 | A1 | | 11/2006 | Markle ................ 219/121.62 |
| 2007/0293058 | A1 | * | 12/2007 | Jennings et al. ............ 438/795 |
| 2009/0095724 | A1 | * | 4/2009 | Talwar et al. .......... 219/121.72 |

* cited by examiner

*Primary Examiner*—Gail Verbitsky
(74) *Attorney, Agent, or Firm*—Allston L. Jones; Peters Verny, LLP

(57) ABSTRACT

Provided is an apparatus for substrate processing. The apparatus may include a radiation source emitting a photonic beam, an optical system to form a beam image, a scanning stage, a temperature monitoring means, an output signal generator that compares the monitored temperature with a preset temperature, and a controller coupled to the radiation source and the stage. The stage may be adapted to scan the substrate so the beam image heats a region of the substrate surface, and the temperature monitoring means may collect and analyzes p-polarized radiation of at least three different spectral regions emitted from one or more places on the heated substrate region. The controller in response to a temperature error signal may be programmed to alter the beam intensity and/or to provide changes in the scanning velocity between the stage and the beam. Other apparatuses and temperature monitoring systems are provided as well.

20 Claims, 6 Drawing Sheets

METHODS AND APPARATUS FOR TEMPERATURE MEASUREMENT AND CONTROL ON A REMOTE SUBSTRATE SURFACE

BACKGROUND OF THE INVENTION

1. Field of the Invention

The present invention relates to apparatuses and methods for remotely measuring the temperature of a surface, and has particular utility in the field of laser thermal processing (LTP) where a beam of radiation is scanned across a substrate surface to heat the surface, and has general utility to thermal processing where the temperature of a surface needs to be known to a relatively high degree of accuracy and precision.

2. Description of the Background Art

LTP is a technique for manufacturing semiconductor devices such as integrated circuits or "ICs". LTP involves irradiating a substrate, such as a doped semiconductor wafer, to bring the substrate surface from a relatively low temperature (e.g., 400° C.) to a relatively high temperature (e.g., 1,300° C.) so quickly that the substrate bulk remains at a low temperature and can pull the surface temperature down quickly. Such a rapid thermal cycle might be used, for example, to efficiently activate dopants in the substrate surface because only the material very close to the top surface of the substrate is heated to the relatively high temperature during irradiation.

As described in U.S. Pat. No. 6,747,245 to Talwar et al., one approach to LTP involves scanning a long, narrow laser beam back and forth across the wafer surface in a raster pattern. The amount of time the laser beam resides over a given point on the wafer surface is called the "dwell time". Using this scanning approach, it is possible to achieve peak surface temperatures near 1350° C. with dwell times in the millisecond range and below. The result is a rapid thermal annealing of doped Si wafers that yields high activation levels with very little dopant diffusion. When used to fabricate transistor-based circuits, transistors with an abrupt dopant profile and with a low sheet resistance are formed. LTP is capable of providing significantly lower sheet resistance values than possible using so-called Rapid Thermal Processing (RTP), which has dwell times equivalent to several seconds. While the LTP process is quick and effective, the results are sensitive to the peak temperature produced on the substrate surface.

Deviations in peak annealing temperatures may be produced as a result of substrate surface reflectivity variations. Deviations in annealing temperatures may also be an artifact of systemic process deviations associated with the apparatuses used to effect LTP. In either case, a difference in the peak annealing temperature of as little as a 5° C. can result in a measurable and undesirable difference in sheet resistance. Accordingly, it would be advantageous to provide a measurement means to ensure uniform heating during LTP. For example, it would be advantageous to be able to measure the maximum substrate surface temperature during LTP. Because of the rapid heating and cooling cycle associated with LTP, and because of the scanning geometry, in practice the peak surface temperature is best measured remotely. An exemplary remote temperature measuring technology is described in U.S. Patent Application Publication No. 20060255017 to Markle. In addition, it would be advantageous to be able to use the temperature measurement to control the amount of power delivered to the substrate surface.

Nevertheless, opportunities exist for improvements to known technologies relating to remote temperature technologies for LTP applications.

SUMMARY OF THE INVENTION

In general, the invention relates to an apparatus for processing a substrate at a desired temperature. The apparatus includes a radiation source adapted to emit a photonic beam and a stage adapted to scan the substrate through the beam such that the beam forms an image for heating a region of the substrate at and/or near a surface thereof. Typically, the beam forms an incident angle of at least 45° relative to the surface normal, e.g., at the Brewster's angle for the substrate.

For example, the apparatus may be used to process in a precisely controlled manner a substrate at a temperature that does not exceed an upper temperature limit such as the melting temperature of the substrate. The controller, in response to the substrate temperature signal, may be programmed to alter the beam intensity and/or to change the relative scan speed between the stage and the beam in a manner such that all heated portions of the substrate exceeds a lower limit temperature. In some instances, the upper and lower limit temperatures define a temperature range span no greater than about 15° C.

Retroreflecting technologies may be used to increase temperature measurement accuracy by making the substrate appear to be more like a black body than it would otherwise. For example, a retro-reflecting means may be used to collect radiation emitted from the heated substrate region at a opposing azimuth angle and at a similar incidence angle and reflect this radiation back toward the heated substrate region. At the substrate some of this radiation is reflected and some is absorbed, however the reflected component supplements the radiation employed to estimate the temperature making the substrate appear more like an ideal black body emitter. A temperature monitoring means is provided. The temperature monitoring means may operate by collecting and analyzing p-polarized radiation of at least three different wavelengths emitted from the heated substrate region. In any case, a controller is typically operably coupled to the radiation source and the stage. In response to a signal from the temperature monitoring means, the controller may be programmed to alter the beam intensity and/or to change the scan speed between the stage and the beam.

The temperature monitoring means may vary. For example, the temperature monitoring means may be constructed to collect radiation from one or more positions on the heated substrate region. For example, a single optical fiber or a bundle of fibers may be used to collect radiation from the substrate. In addition, the temperature monitoring means may be constructed to collect radiation emitted from the substrate at an angle that differs from the incident angle of the laser beam. In any case, the temperature monitoring means may include a spectrometer or a number of spectral band-pass filters. A detector array may be used to separate the emitted p-polarized radiation into different wavelengths and/or spatial positions. A relay lens and one or more fibers may be arranged to sample radiation from various positions on the substrate and arrange them along an entrance slit of the spectrometer or with respect to an array of spectral band-pass filters. A field-programmable gate array may be used to process the detected signals, converting each signal and each signal ratio into a separate temperature estimate corresponding to a particular position. The temperature estimates corresponding to a particular position are then combined using a weighted average to yield an average temperature. The weights employed in the weighted average are derived from measurements on a variety product wafers.

The temperature monitoring means detects p-polarized radiation intensities of first, second and third wavelengths (L1, L2, and L3) emitted from the substrate region heated by the laser beam image and calculates an estimated temperature ($T_E$) of the heated region from first, second, and third wavelength temperature signals, ($S_{L1}$, $S_{L2}$, and $S_{L3}$) and from their ratios ($S_{L3}/S_{L1}$, $S_{L3}/S_{L2}$, $S_{L2}/S_{L3}$). The relationship between the detector signal and the maximum substrate temperature or between the signal ratio and the maximum substrate temperature may be determined by using a power setting corresponding to the melting temperature of the substrate, which is about 1410° C. for a silicon substrate. Calibration points at other temperatures may then be determined by making assumptions about how the maximum temperature might be expected to vary with laser power. In any case, the temperature estimates are generated from a radiation detector signal in the temperature monitoring means and is provided at a sufficiently high transfer rate, e.g., a transfer rate of at least 100 Hz, to ensure proper control of the heating means.

The detector signals from the 3 separate color detectors yield 6 separate temperature estimates for the same point on the substrate ($T_{L1}$, $T_{L2}$, $T_{L3}$, $T_{L3/L1}$, $T_{L3/L2}$ and $T_{L2/L1}$). These 6 estimates for the temperature may be combined into a single, final average temperature, $T_F$, using a weighted average as follows: $T_F = W_1 \cdot T_{L1} + W_2 \cdot T_{L2} + W_3 \cdot T_{L3} + W_4 \cdot (T_{L3/L1}) + W_5 \cdot (T_{L3/L2}) + W_6 \cdot (T_{L2/L1})$, where $0.1 \leq W_1 \leq 0.6$, $0.1 \leq W_2 \leq 0.4$, $0.1 \leq W_3 \leq 0.4$, $0.1 \leq W_4 \leq 0.2$, $0 \leq W_5 \leq 0.15$, $0 \leq W_6 0.1, L1 > L2 > L3$, and $W_1 + W_2 + W_3 + W_4 + W_5 + W_6 = 1$.

Figure 1:
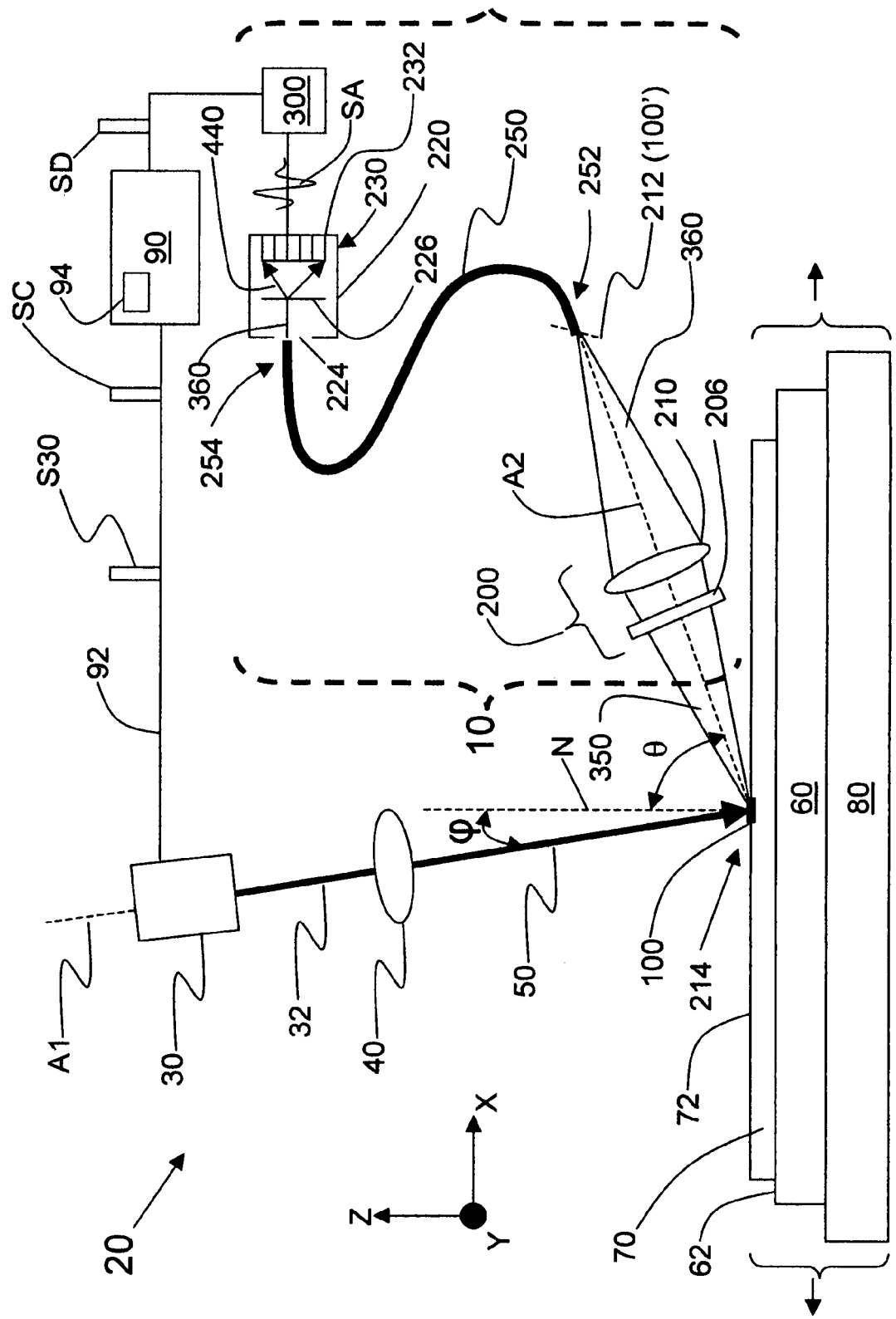
FIG. 1 is a schematic diagram of the temperature measurement apparatus of the present invention and is shown measuring the temperature of a substrate surface being irradiated with a scanned radiation beam generated by a radiation source, wherein the temperature measurement apparatus is adapted to control the output power of the radiation source.

The various elements depicted in the drawings are merely representational and are not necessarily drawn to scale. Certain proportions thereof may be exaggerated, while others may be minimized for clarity of presentation. The drawings are intended to illustrate various implementations of the invention, which can be understood and appropriately carried out by those of ordinary skill in the art.

DETAILED DESCRIPTION OF THE INVENTION

Definitions and Overview

Before describing the present invention in detail, it is to be understood that this invention, unless otherwise noted, is not limited to specific substrates, temperature measuring means, or materials, all of which may vary. It is also to be understood that the terminology used herein is for the purpose of describing particular embodiments only, and is not intended to be limiting.

It must be noted that, as used in this specification and the appended claims, the singular forms "a", "an" and "the" include both singular and plural referents unless the context clearly dictates otherwise. Thus, for example, reference to "a beam" includes a plurality of beams as well as a single beam, reference to light of "a wavelength" includes a light of a spectral range or plurality of wavelengths as well as a light of a single wavelength, reference to "a temperature" refers to a plurality of temperatures as well as a single temperature, reference to "a region" includes a combination of regions as well as single region, and the like.

In describing and claiming the present invention, the following terminology will be used in accordance with the following definitions.

The terms "Brewster's angle" or Brewster angle" is used to refer to the angle of incidence, i.e. the angle between a radiation beam and a dielectric surface normal that corresponds to the minimum or near-minimum reflectivity of the P-polarized component of the beam. Films on the surface of an object, such as a silicon wafer, may prevent it from exhibiting zero reflectivity at any angle. If, however, the films are dielectric in nature, then there generally will be an angle of minimum reflectivity for P-polarized radiation. Accordingly, the Brewster's angle as used herein for a specular surface formed from a variety of different dielectric films stacked on a substrate can be thought of as an effective Brewster's angle, or the angle at which the reflectivity of P-polarized radiation is at a minimum. This minimum angle typically coincides with or is near the angle of the Brewster's angle for the substrate material.

As a related matter, the term "specular surface" means a surface that is either entirely or substantially flat and partially reflecting, as opposed to one that is substantially rough and scattering. These criteria depend on the wavelengths and angles used to measure the properties of the surface.

The term "energy utilization" as in the "energy utilization of an image" refers to the proportion of energy associated with the portion of the image useful for producing a desired effect relative to the total beam energy in the image. For example, in an annealing application the "useful portion" of an image may be only that part of the beam that comes within about one or two percent of the maximum or peak beam intensity. A small modification to the image profile shape can produce a large change in the "energy utilization".

The term "intensity profile" in reference to an image or a beam refers to the distribution of radiation intensity along one or more dimensions. For example, an image may have a useful portion and a non-useful portion. The useful portion of an image typically has a "uniform" intensity profile that exhibits substantially the same intensity. In other words, the intensity profile integrated in the scan direction throughout the useful portion of the image may be substantially constant. Accordingly, any point on a substrate surface region that is scanned by a useful portion of an image having a uniform intensity profile will be heated to the same temperature. However, the intensity or intensity profile of the non-useful portion may differ from that of the useful portion. Thus, the image as a whole may have an overall "non-uniform" intensity profile even though a useful portion by itself may exhibit a uniform intensity profile.

As a related matter, the term "peak intensity value" of an image or a beam refers to the point of highest intensity in the image or beam. Typically, the entirety of the useful portion of an image will exhibit an intensity very close to the peak intensity.

The term "light emitting photodiode (LED)" refers to a diode that is typically made from semiconductor material, and which converts an applied voltage to photonic radiation. The terms "diode" and "LED" are generally interchangeably used herein, however this is not to be confused with the term "photodiode", which may refer to a photo-detector that converts incident radiation into an electrical current. The term "laser diode" refers to a type of LED that emits coherent light when forward biased.

The term "semiconductor" is used to refer to any of various solid substances having electrical conductivity greater than insulators and less than good conductors, and that may be used as a base material for computer chips and other electronic devices. Semiconductors include elements such as silicon and germanium and compounds such as silicon carbide, aluminum phosphide, gallium arsenide, and indium antimonide. Unless otherwise noted, the term "semiconductor" includes any one or a combination of elemental and compound semiconductors, as well as strained semiconductors, e.g., semiconductors under tension or compression. Exemplary indirect bandgap semiconductors suitable for use with the invention include Si, Ge, and SiC. Direct bandgap semiconductors suitable for use with the invention include, for example, GaAs, GaN, and InP.

The terms "substantial" and "substantially" are used in their ordinary sense and refer to matters that are considerable in importance, value, degree, amount, extent or the like. For example, the phrase "substantially Gaussian in shape" refers to a shape that corresponds predominantly to the shape of a Gaussian probability distribution curve. However, a shape that is "substantially Gaussian" may exhibit some characteristics of a non-Gaussian curve as well, e.g., the curve may also include a component described by a polynomial. Similarly, a "substantially uniform" intensity profile will contain a relatively flat portion where the intensity does not deviate more than a few percent from the profile's peak intensity. Preferably, the intensity deviation is less than about 2%. Optimally, the intensity deviation is no more than about 1% or no more than about 0.8%. Other uses of the term "substantially" involve an analogous definition.

The term "substrate" as used herein refers to any material having a surface, which is intended for processing. The substrate may be constructed in any of a number of forms, for example, such as a semiconductor wafer containing an array of chips, etc.

In general, the present invention relates to apparatuses and methods for remotely measuring the temperature of a substrate surface, specular or otherwise, and has particular utility in the field of laser thermal processing (LTP). For example, an aspect of the invention relates to an apparatus for processing a substrate having a surface. The apparatus may include a radiation source adapted to emit a photonic beam and a stage adapted to hold a substrate having a surface positioned such that the beam forms a image for heating a region of the substrate at and/or near the surface to achieve a predetermined maximum temperature on the substrate. Typically provided is a means for measuring and/or monitoring temperature that collects and analyzes p-polarized radiation of different wavelengths emitted from a heated substrate region to determine whether the predetermined temperature is achieved. The temperature monitoring and/or measuring means may be used to generate an output signal. A controller that is operably coupled to the radiation source and the stage may, in response to the output signal, be programmed to alter the beam intensity and/or alter the scanning speed between the stage and the beam to effect thermal processing at a constant temperature.

Typically, multiple spectral measurements of the photon flux emitted from a substrate surface region are employed to monitor the temperatures achieved. The measurements may be made simultaneously or in succession and at any angle however it is generally preferable to measure at or near the Brewster's angle. Each measurement corresponds to a different spectral band (wavelength) and/or to a different position on the substrate surface. These measurements, both separately and in combination, may be processed to yield a number of independent temperature estimates. By employing an algorithm that processes the temperature estimates and performs a weighted average of the results generated by the algorithm driven process, a determination may be made as to the temperatures achieved for each surface position sampled over time. Thus, the invention may be used, among other things, to ensure that thermal processing temperatures do not exceed an upper limit, drop below a lower limit and/or deviate out of a desired range. Optionally, an alarm may be used to indicate whether the limits are exceeded.

LTP System with Temperature Monitoring Means

FIG. 1 is a schematic diagram of an exemplary apparatus 10 of the present invention in the context of an LTP system 20. As shown, LTP system 20 may include a radiation source 30 that emits radiation 32 along an optical axis A1 that lies in a plane intersecting the X-Z plane and the X-Y plane, e.g., the Y-Z plane and at a incidence angle equal to the Brewster's angle relative to a surface normal N. For infrared radiation, the Brewster's angle of silicon is about 75°.

LTP system 20 may also include an optical system 40 arranged along optical axis A1 downstream from radiation source 30. Optical system 40 is adapted to receive radiation 32 and form therefrom an LTP radiation beam 50 that travels along optical axis A1. In an example embodiment, radiation source 30 may be a laser, such as a $CO_2$ laser, which generates a beam 32 of radiation with an intensity profile that is substantially Gaussian in nature. The beam 32 has a peak intensity value in its center and a useful portion of generally uniform intensity at or near the peak intensity value. LTP system 20 may also include a substrate holder 60 in the form of a chuck having an upper surface 62 adapted to support a substrate 70 that has an upper surface 72. Substrate chuck 60, in turn is supported by a movable stage 80. A controller 90 is operably coupled to radiation source 30 via an electrical line 92. Controller 90 controls the amount of radiation 32 emitted by the radiation source via a control signal S30.

In general, the various components of the invention, e.g., temperature monitoring means and controller of the invention, may not necessarily be provided as separate modules. For example, as shown in FIG. 1, when the temperature measurement apparatus 10 is used in combination with an LTP system 20, controller 90 can, in some instances, be considered as part of both the temperature measurement apparatus and the LTP system. In an example embodiment, controller 90 is a computer having a processor 94, or a field-programmable gate array (FPGA) that is programmable to carry out logic operations and perform algorithms, such as those described below. Controller 90 is also adapted to carry out signal processing, as described below.

In the operation of LTP system 20, controller 90 generates control signal S30 and sends it to radiation source 30. In response thereto, radiation source 30 generates radiation 32, which leads to the creation of LTP radiation beam 50, as described above. Radiation beam 50 irradiates substrate upper surface 72 by forming thereon an image 100. In an example embodiment, image 100 is in the form of a line image. Movement of stage 80 causes image 100 to scan over substrate surface 72. In an example embodiment, stage 80 is moved in a manner such that image 100 raster scans over substrate surface 72, with portions of image 100 below a certain intensity threshold overlapping those with an intensity above the threshold so each point on the surface receives nearly the same maximum intensity and is brought to the same maximum temperature to a high degree of uniformity.

The closed control loop between the temperature monitoring means and the laser power supply provides very tight control of the maximum process temperature seen by every point on the substrate. This virtually eliminates the effects of any non-uniformity in the starting temperature of the substrate just prior to annealing or the effects of changes in the optical path between the laser and the substrate. However to ensure that this control loop is stable and remains so, it may be necessary to ensure that the bandwidth of the temperature monitoring means be about 10 times greater than the bandwidth of the system controlling the laser power output. This ensures that the inevitable phase shifts or delays in the estimated temperature measurement do not result in positive feed-back and control loop instability. In a typical example, the bandwidth of the temperature measurement system might be 10 kHz and the bandwidth of the laser power control system might be 1 kHz.

Generally, only a very small portion of substrate surface 72 is irradiated at any given time. During scanning a point on the wafer is heated to a high temperature, e.g. 1350° C., and then rapidly cools as it moves away from beneath the laser beam image. The amount of time image 100 spends over any given point on substrate surface 72 is called the "dwell time" and is typically on the order of milliseconds or less.

Temperature Monitoring Means

With continuing reference to FIG. 1, apparatus 10 may also include an optical axis A2 along which is arranged an optical system 200. Optical system 200 includes a polarizer 206 that passes P-polarized light, and a relay lens 210. Relay lens 210 has corresponding image and object planes 212 and 214, with object plane 214 being tilted to be co-planar with a portion of substrate surface 72. Optical axis A2 forms an angle θ relative to surface normal N and lies in the X-Z plane. In a preferred example embodiment, angle θ is at or near the Brewster angle corresponding to the measurement wavelengths refractive indices for substrate 70. In an example embodiment where substrate 70 is silicon, the Brewster's angle is between about 73.7° and 75° and the measurement angle θ can be between 65° and 75°.

Apparatus 10 also includes one or more fibers that optically span the heated area of the substrate and collect a representative radiation sample from that area. At the output end of each fiber there is some means of splitting the radiation into three separate spectral regions each of which is measured by a detector. One possible means for separating the three spectral components is a spectrometer 220 having an entrance slit 224. Spectrometer 220 is adapted to received radiation through entrance slit 224, spatially disperse the radiation as a function of wavelength, e.g., via a diffraction grating 226, and detect the spatially dispersed radiation, e.g., via a photodetector array 230 having a plurality of detector elements 232. Suitable photodetector arrays might include silicon CCD or CMOS detector arrays similar to those used in digital cameras, but without a separate color filter on each pixel. Also small individual detectors may be used as well.

Apparatus 10 also includes one or more optical fibers 250 having a planar input end 252 and a planar output end 254. Fiber bundle input end 252 is arranged in image plane 212, while fiber bundle output end 254 is arranged at spectrometer entrance slit 224. In an example embodiment, the spectrometer entrance slit is curved, and the one or more optical fibers are arranged around the curved slit. Thus, optical fibers 250 optically couple optical system 200 to spectrometer 212.

Apparatus 10 further includes an analog-to-digital (A/D) converter 300 electrically coupled to photodetector array 230. A/D converter 300 is adapted to receive an analog signal and convert it to a digital signal. A/D converter 300 is also electrically coupled to controller 90, which, in an example embodiment, includes digital electronics (e.g., processors, memory, etc.), not shown, that may require a digital signal input. The controller 90 closes the servo loop between the temperature sensor and the laser so servo-loop stability is always maintained. Optionally, the A/D may be connected to digital filtering and phase correcting circuits in controller 90.

Image plane 212 may be tilted as a result of tilted object plane 214. This tilt can be accommodated if the fibers of bundle 250 are kept parallel to the optical axis A2 and the squared-off ends of each fiber are positioned so the end is bisected by the tilted image plane 212.

Method of Operation

In operation, optical system 200 collects radiation 350 emitted from a portion of surface 72 of substrate 70 that lies near object plane 214. Ideally optical system 200 will be doubly telecentric so the collection geometry is the same for each fiber when multiple fibers are employed. In FIG. 1, the radiation of interest is that emitted by the portion of the substrate being heated by image 100. The amount of radiation 350 collected is determined by the numerical aperture (NA) of relay lens 210 and the size of the collecting fiber. Collected radiation 350 passes through P-polarizer 206, which passes the P-polarization component of radiation 350, thus forming polarization-filtered (i.e., P-polarized) radiation 360. The P-polarized radiation 360 is then imaged onto optical fiber end 252, which is arranged so the end of the fiber cuts across the tilted image plane 212. Optical fiber bundle 250 then conveys the radiation imaged onto its input end 252 to its output end 254 located at spectrometer entrance slit 224.

Figure 2:
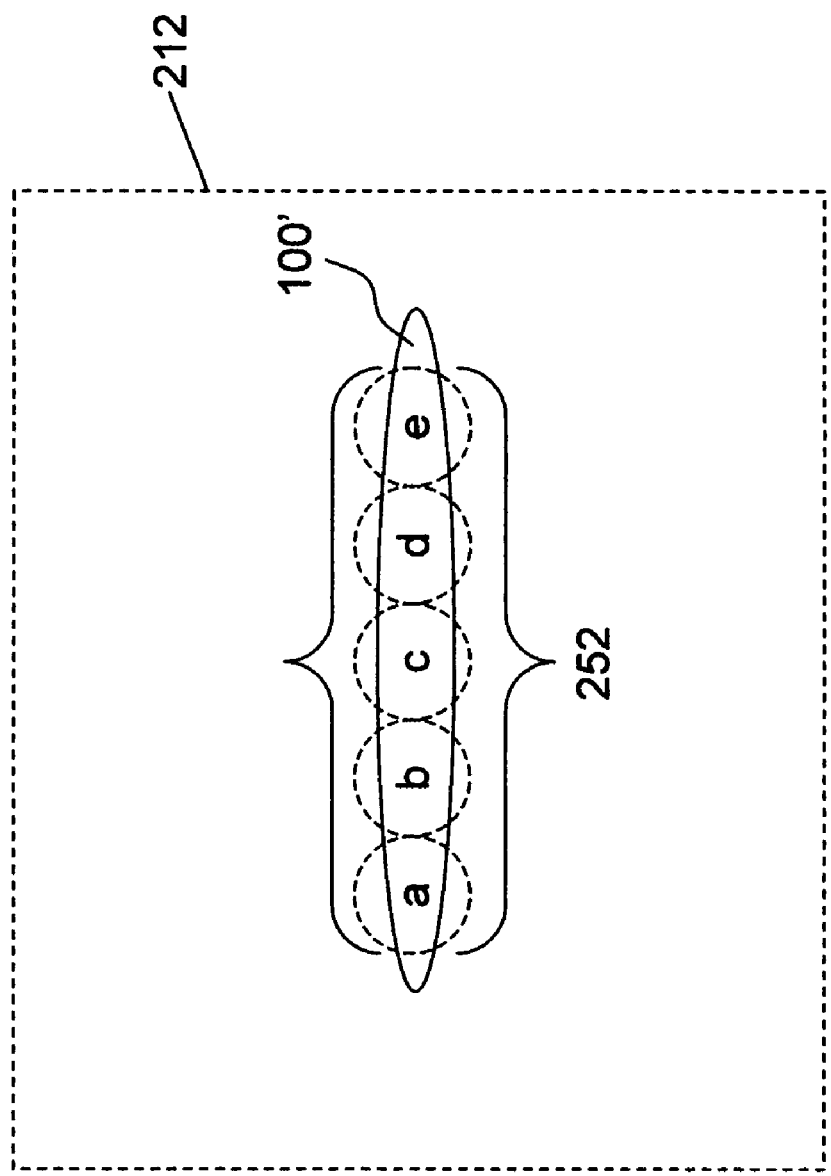
FIG. 2 schematically depicts a plurality of optical fibers that when imaged onto the substrate will span a section of the hottest area.

FIG. 2 depicts an example arrangement of five optical fiber ends 252 shown in dashed lines optically imaged onto the substrate containing a narrow heated zone image 100. The individual optical fiber ends 252 are identified as "a", "b", "c", "d" and "e". Optical fiber ends 252 are arranged to sample portions of heated zone image 100, which is imaged onto the input end to form a secondary image 100' via optical relay 210. Ideally the hottest part of the substrate is centered in the overall linear footprint of the fiber image so small motions of the heated portion of the substrate do not cause significant variations in the amount of radiation collected by the fiber. It is also possible to employ different numbers of fibers, e.g., one or more, that span one or more different portions of the heated area.

Figure 3:
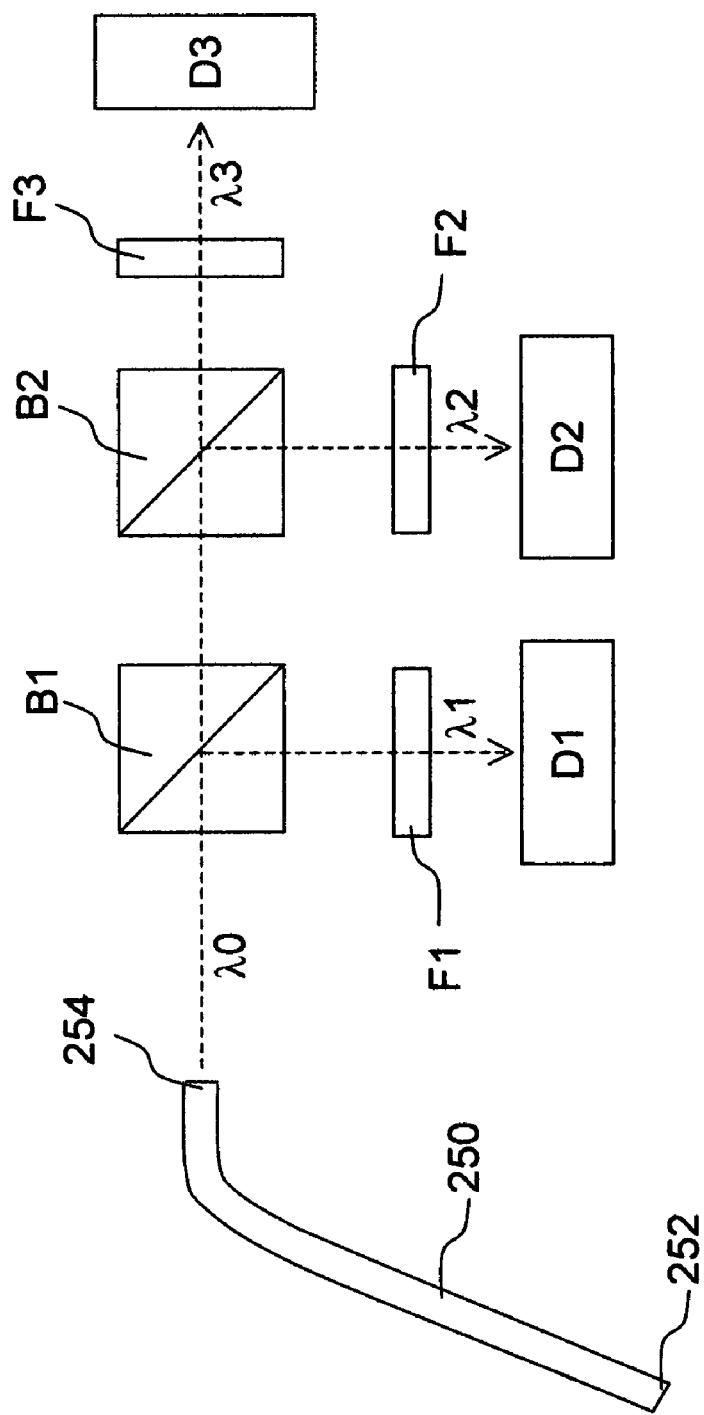
FIG. 3 is schematic showing the output end of a fiber. Radiation emitted from the fiber is collected and reimaged by a lens onto three detectors, each of which has a spectral filter in front that selects a narrow portion of the spectrum.

In some instances, bandpass filters may be used to split the output beam from each fiber into spectral components each of which is measured separately. For example, as shown in FIG. 3, unmodified light of wavelength λ0 emerging from fiber end 254 may be split into three individual beams through the use of beamsplitters B1 and B2. The three beams may then be individually filtered using individual bandpass filters F1, F2, and F3. As a result, each beam exhibits a different wavelength, λ1, λ2, and λ3, which may be individually measured using detectors D1, D2 and D3, respectively.

Referring back to the equivalent portion of FIG. 1, the output beam 360 from the fiber 250 may alternatively pass through spectrometer entrance slit 224 to diffraction grating 226. Notably, optical fibers generally scramble the light polarization so the radiation at this point is not very polarized. Diffraction grating 226 spatially disperses radiation 360 as a function of wavelength, thereby creating spatially dispersed radiation (i.e., a spectrum) 440. Spectrum 440 falls upon photodetector array 230, which detects the intensities of different wavelengths in the spectrum depending on the position of each detector in the detector array.

In response to detecting spectra 440 corresponding to each sampled portion of the substrate surface, photodetector array 230 generates analog signals SA representative of the spectral intensity. Analog signals SA are provided to A/D converter 300, which converts the analog signals to corresponding digital signals SD. Signals SD are then provided to controller 90. Controller 90 closes the servo loop between the temperature sensor and the laser so servo-loop stability is always maintained. Digital filtering and phase correction steps may be carried out by an FPGA or other means. Controller 90 is adapted to receive and process the signals via an algorithm, described below, that calculates a temperature for the different positions of substrate surface 72 that correspond to the different sampled positions of the substrate.

The algorithm in controller 90 is also adapted to calculate a maximum temperature $T_{MAX}$ for the imaged portion of substrate surface 72. This maximum temperature $T_{MAX}$ is compared with a desired maximum temperature $T_D$, which for example is stored in controller 90. The two temperatures $T_{MAX}$ and $T_D$ are compared and a correction signal SC is generated and sent to radiation source 30. Correction signal SC is adapted to alter the amount of power delivered by radiation source 30 to maintain the measured maximum temperature $T_{MAX}$ at or close to the desired maximum temperature $T_{MAX}$. In an alternate example embodiment, the correction signal is incorporated directly into control signal S30.

Temperature Measurement Algorithm

In general, remote temperature detection of an object can be based on measuring the photon flux (photons per unit area) emitted from the surface of the object in a given spectral band. However, this detection method generally assumes a surface emissivity, ε. For a specular surface, the emissivity, ε, is related to the surface reflectivity, r, by the following equation:

$$\epsilon = 1 - r \quad (1)$$

A number of patents describe remote temperature detection technologies. For example, U.S. Pat. No. 6,222,454 to Harling et al. describes that the ratio of two radiative flux measurements made at different wavelengths can be used to calculate a temperature. In addition, U.S. Pat. No. 5,772,323 to Felice describes techniques that employ statistically evaluated and averaged independent temperature estimates based on measured ratios to yield a final best estimate temperature. These measurements are typically made at or near normal incidence using unpolarized radiation and may be made on rough or non-specular surfaces. This invention provides a different approach in that the detection geometry may be chosen so the emissivity is "pushed" towards unity.

A perfect black body has an emissivity ε=1. (The emissivity is the ratio between the radiation emitted from a specific radiator and that from a perfect "black body" radiator.) The equation for the photon flux W emitted from a black body is given by:

$$W_\lambda = \epsilon C_1 / \lambda^5 (e^{C_2/\lambda T} - 1) \quad (2)$$

where $W_\lambda$ is the radiant flux per unit area per unit wavelength increment from a perfect black body at absolute temperature T in degrees Kelvin (° K), $C_1$ is a constant=3.7413×10⁻¹² Watt cm², λ is the wavelength in cm, $C_2$ is a constant 1.4388 cm ° K, and T is the absolute temperature in ° K.

Figure 4:
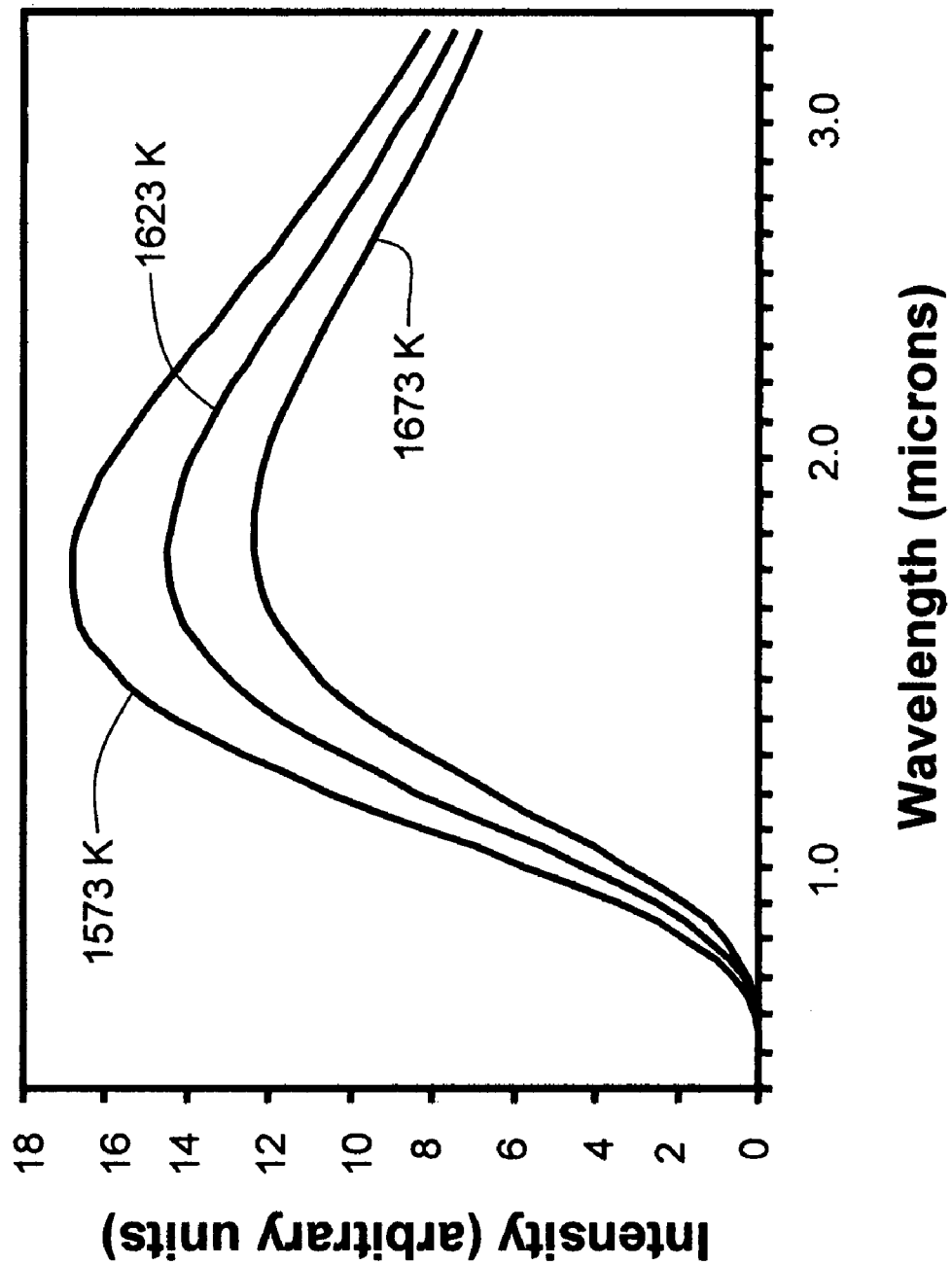
FIG. 4 is a plot of the black-body spectral emission for three different temperatures: 1573 K, 1623 K and 1673 K.

The black-body spectral emission given by equation (2) is plotted in FIG. 4 for three different temperatures: 1573° K, 1623° K and 1673° K. The total power radiated varies as the $4^{th}$ power of the absolute temperature T and the variation in power near the peak emission for the example temperatures shown varies similarly as the $4^{th}$ power. While no object is a perfect black body, most objects radiate as gray-bodies with surface emissivities (ε) different than 1 and which vary with wavelength and temperature. Thus, by measuring radiative flux from a surface in a given spectral band, it is possible to estimate the temperature of the surface using the black-body equation (2) provided one can also accurately estimate the surface emissivity, ε, at the measurement wavelength and the substrate temperature.

Surface temperature estimates can also be obtained based on the ratio of radiative emissions measured in two spectral bands, assuming that the emissivity is the same at both wavelengths. This approach is illustrated by the data in Table 1, which gives the ratios of the spectral emissions for three different wavelengths—0.4 microns, 0.7 microns and 1.1 microns—as calculated using equation (2). The 0.4 to 1.1-micron spectral ratio turns out to be a convenient one covered by the spectral range of silicon detectors and silicon CCD and CMOS detector arrays suitable for use as photodetector array 230 (FIG. 1).

TABLE 1

| | Spectral Emission Ratios | | |
|---|---|---|---|
| T (K) | Emission Ratio 0.4/0.7 | Emission Ratio 0.4/1.1 | Emission Ratio 0.7/1.1 |
| 1573 | .00091 | .0000753 | .0828 |
| 1623 | .00123 | .000118 | .0958 |
| 1673 | .00164 | .000180 | .1099 |

Temperature measurement apparatus 10 allows for simultaneous measurements made at three separate wavelengths, resulting in three different temperature estimates based on the radiative emissions measured at each wavelength. In an example embodiment, three different temperature estimates are also made based on the three different possible ratios of the three radiative emission measurements. Thus, radiative emission measurements at three different wavelengths lead to a total of 6 temperature estimates. Likewise, four different radiative emission measurements allow for a total of 4+6=10 separate temperature estimates, etc.

By appropriately weighting and combining these estimates using the approach described below, a final temperature, $T_F$, is calculated for each sampled position. Although the emissivity, ε, of the surface being measured can vary with temperature and with wavelength, it cannot exceed unity. Thus, temperature measurements made on the basis of the measured radiation flux received at a single wavelength tend to under-estimate the maximum temperature. Using a programmable high-speed processor as part of controller 90, such as field programmable gate array (FPGA), a "most likely maximum temperature" is calculated at high speed, e.g. a speed corresponding to a bandwidth of 10 kHz. This calculation is used to control the laser output power and is recorded along with the corresponding scan position, to provide a record of the temperature as a function of surface position.

In addition, the maximum temperature, $T_{MAX}$, may be used to control the output level of a radiation source that is used to irradiate the substrate. Typically this control might be used to maintain the maximum temperature during LTP to within ±0.2% from a desired LTP processing temperature, $T_D$. This type of servo control eliminates concerns about the temperature uniformity of the substrate just prior to annealing. It also compensates for detrimental system performance due to variations in the laser beam intensity that might be caused by changes in the laser cavity temperature or in the optical system transmission between the laser and the substrate. Similarly, it compensates for variations in reflectivity of the substrate caused by the uneven distribution of thin-film stacks over the substrate surface. Since a typical LTP scan speed is about 125 mm/second, a temperature measurement bandwidth of about 25 Hz would allow for compensating temperature variations occurring over a centimeter of scan path. An even higher bandwidth is desirable so changes in reflectivity caused by differences in circuit density on the wafer can be accommodated.

Flow Diagram of Algorithm

Figure 5:
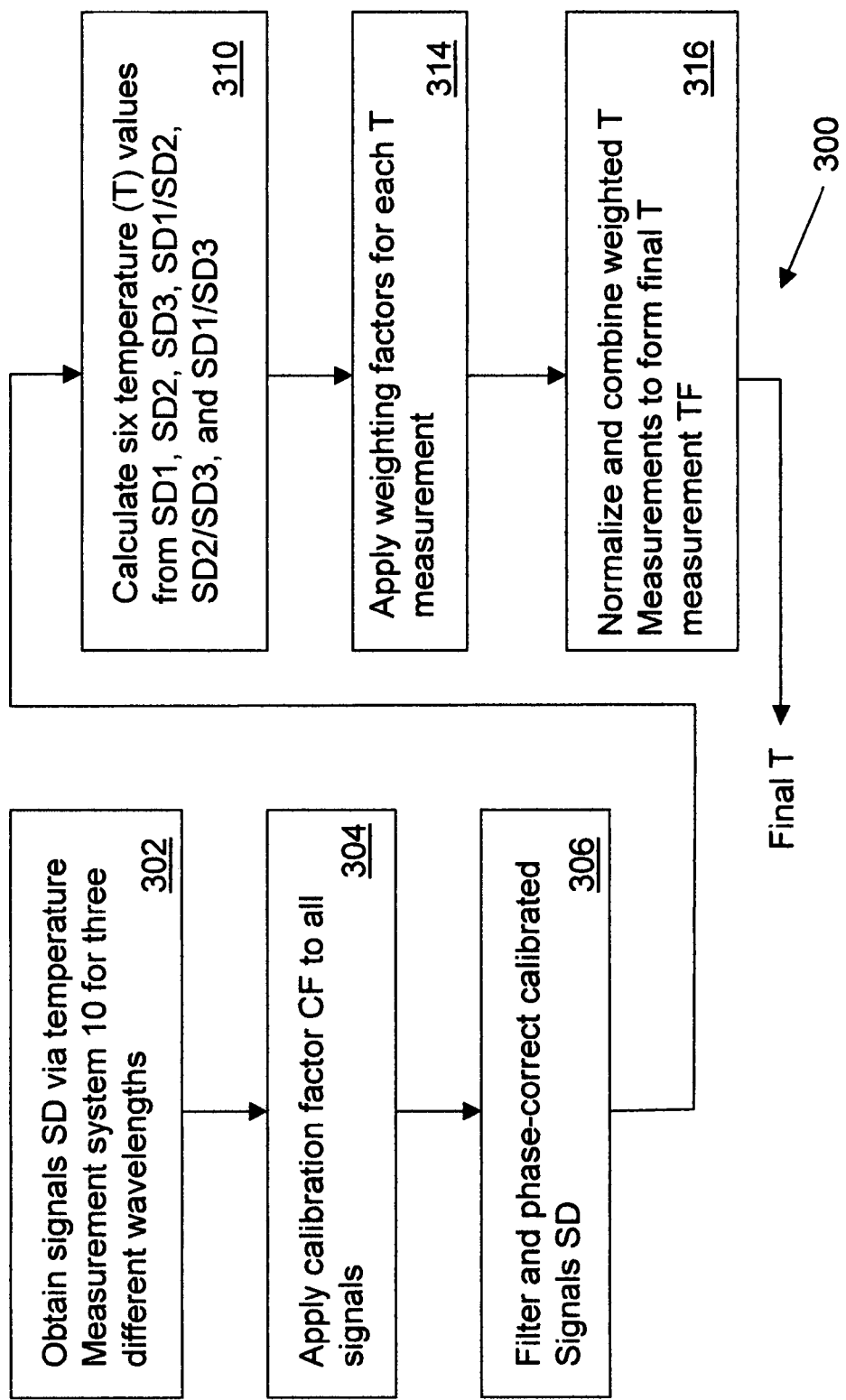
FIG. 5 is a flow diagram of the method of determining the temperature of a surface at a given point using the system of FIG. 1, and is based on making measurements of the emitted radiation at three different wavelengths.

FIG. 5 is a flow diagram 300 of an example embodiment of the temperature measurement method (algorithm) of the present invention for estimating the temperature sensed by detecting radiation collected by a single fiber and covering an area spanning the narrow zone of high temperature on the wafer. In step 302, temperature measurement apparatus 10 is used to obtain signals $SD_x$ for three different wavelengths as described above. These signals will be referred to as $SD_1$, $SD_2$ and $SD_3$. Signals $SD_1$-$SD_3$ are then stored in controller 90.

In step 304, a separate calibration factor, $CF_x$, is applied to all signals $SD_1$-$SD_3$ to derive the maximum substrate temperature $T_{max}$:

$$T_{max} = (CF_x)(SD_x) + C_x \quad (3)$$

Equation (3) assumes a linear relationship between the maximum temperature and the detected signal, which is reasonable over a limited temperature range. A larger temperature range would have to employ a higher order polynomial to obtain a good approximation. The calibration factor is needed to compensate for spectral transmission, spectral dispersion, and spectral detection sensitivity differences from one wavelength to another. A model to accurately predict the temperature distribution created on the wafer surface should take into account variations in specific heat, thermal conductivity and density with temperature, as well as the dwell time and incident energy distribution profile. These will vary depending on the substrate type.

An alternative to relating the detected signal levels to maximum temperature with an analytical model is to measure the relationship directly. This might be done using a polished substrate surface of the same material as is used for processing that can be heated to various temperatures and measured with an accurately calibrated thermocouple or thermistor. This calibration aid has the advantage that any variations in emissivity from unity are cancelled since they would be the same for the calibration aid and the process piece. However this scheme would presumably heat the whole substrate uniformly and would not take into account the limited spatial distribution of the heated area produced by the laser scanning system. The differences in spatial distributions would have to be accounted for using the analytical model. The calibration procedure establishes a unique relationship between the maximum substrate temperature and each of the 3 signal amplitudes or any of the three possible signal ratios.

The calibration procedure using the polished substrate ensures that consistent and accurate temperature estimates can be made from each of the 3 signal amplitudes, assuming the emissivity of the wafer being measured is closely approximated by the unpatterned, polished substrate used for calibration. It follows that the calibration procedure can also generate conversion factors, which when applied to any of the 3 possible signal ratios also lead to an accurate temperature estimate, subject to the same assumption. If the substrate were a gray body, i.e. having an emissivity less than unity and having the same emissivity at each wavelength, then the temperature estimates derived from the signal amplitudes would all be low, however the temperature estimates derived from the signal ratios would all be accurate. Similarly, if the emissivity at one wavelength was substantially less than unity, then the temperature estimate based on the signal amplitude at this wavelength would be too low and two estimates based on ratios containing this signal would be incorrect. Thus careful analysis of the 6 temperature estimates can lead to a better temperature estimate than any one estimate or an average estimate.

In step 306, signals SD are phase filtered and phase corrected through techniques known to those of ordinary skill in the art.

In step 310, six values of temperature—say $T_1$ through $T_6$—are calculated based on the absolute signals values $SD_1$-$SD_3$ obtained in step 306, along with their corresponding ratios $SD_3/SD_1$, $SD_3/SD_2$ and $SD_2/SD_1$ using the calibration data.

In step 314, weighting factors $W_1$ through $W_6$ for each temperature measurement $T_1$ through $T_6$ are calculated and applied to each measurement. Weighting factors may be arrived at by a number of methods known in the art, including an empirical fit to data obtained from a wide variety of product wafers. For example, empirically arrived at weighting factors for optimized thermal processing of silicon wafers using a $CO_2$ laser are set forth below in relation to equation (4).

In step 316, the weighted temperature estimates T1' through T6' are combined into a single final temperature measurement $T_F$. This procedure is repeated for each fiber sensor to yield a temperature for each:

$$T_F = W_1 \cdot T1 + W_2 \cdot T2 + W_3 \cdot T3 + W_4 \cdot T4 + W_5 \cdot T5 + W_6 \cdot T6 \quad (4)$$

where $0.1 \leq W_1 \leq 0.6$,
$0.1 \leq W_2 \leq 0.4$,
$0.1 \leq W_3 \leq 0.4$,
$0.1 \leq W_4 \leq 0.2$,
$0.0 \leq W_5 \leq 0.15$,
$0.0 \leq W_6 \leq 0.1$,
L1 > L2 > L3, and
$W_1 + W_2 + W_3 + W_4 + W_5 + W_6 = 1$.

Typically, the subscript L1 refers to a red wavelength of about 680 nm to about 590 nm, e.g., 650 nm; L2 refers to a green wavelength of about 570 nm to about 500 nm, e.g., 510 nm; and L3 refers to a blue wavelength of about 500 nm to about 445 nm, e.g., 475 nm. However, other color combinations may be used as well. Image temperature uniformity can be measured by comparing the maximum temperatures obtained from two or more fiber sensors arranged to sample radiation from different parts along the length of the laser image.

Calibration of Temperature Measurement System

It is possible in theory to relate the maximum substrate temperature to the detector signal using a knowledge base that includes the spectral sensitivity of photodetector array 230, and the transmission characteristics of polarizer 206, relay lens 210 and the dispersion characteristics of spectrometer 220 or the spectral characteristics of the bandpass filters. However, even this calculation would be misleading because each fiber views a temperature distribution on the wafer that typically consists of a very narrow line, a few microns wide, of maximum temperature surrounded by a quick fall-off in temperature on either side. This temperature distribution changes with the scanning rate and with the thermal characteristics of the substrate. Thus, to obtain accurate temperature estimates in practice, it may be necessary to calibrate the system in an operational mode employing substrates with known characteristics and with power levels known to produce a given maximum temperature such as the onset of melting or a certain sheet resistance in a substrate with a known doping profile.

A set of calibration curves allows the temperature to be deduced from emission measurements from the hottest portions of the substrate surface. The maximum surface temperature, $T_{MAX}$, is used in a feed-back loop to keep the maximum temperature produced by the radiation source just below or equal to a maximum temperature limit, e.g., desired temperature, $T_D$.

Enhancing the Surface Emissivity of a Specular Surface

Figure 6:
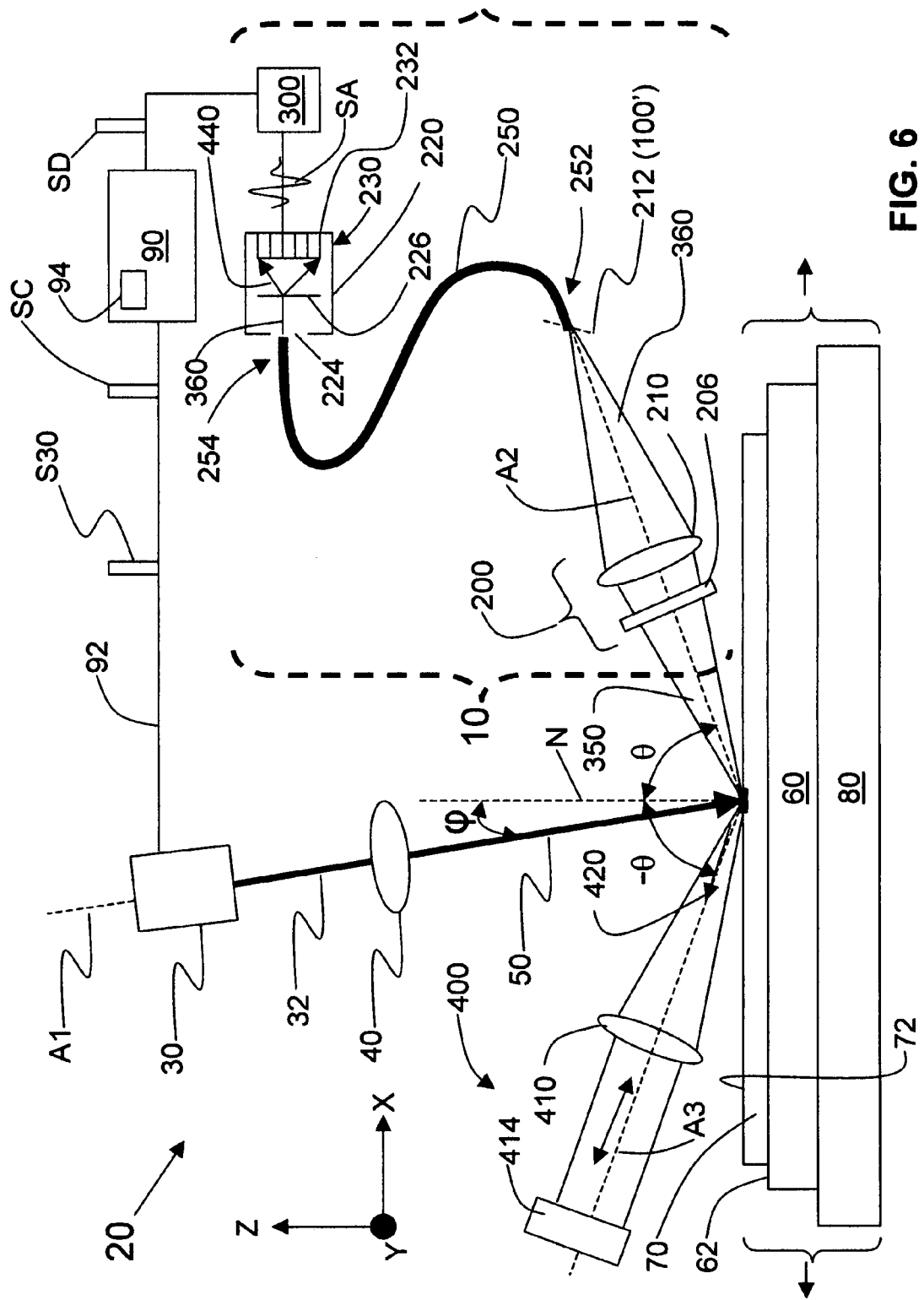
FIG. 6 is a schematic diagram of an example embodiment of a temperature measurement apparatus similar to that of FIG. 1, but that further includes a recycling optical system that may serve to enhance the apparent emissivity of the substrate surface as seen by the temperature measurement system.

FIG. 6 is a schematic diagram similar to that of FIG. 1 that also includes a retro-reflecting optical system ("recycling optical system") 400. Recycling optical system 400 includes an optical axis A3 along which is arranged relay lens 410 and a retro-reflector 414, such as a corner-cube reflector. Optical axis A3 is arranged at an angle $-\theta$ relative to surface normal N, and intersects substrate surface 72 at image 100, i.e., where optical axis A2 intersects the substrate surface. In an example embodiment, the angles $\theta$ and $-\theta$ for axes A2 and A3 are equal and opposite and at or near the Brewster angle.

Recycling optical system 400 is adapted to collect radiation 420 emitted by a portion of substrate surface 72 and return ("recycle") it to the same portion of the surface at a similar angle of incidence at the opposite azimuth angle. If substrate 70 is not a perfect black body, then some of the recycled radiation will be reflected from the surface (even at or near the Brewster angle) and will supplement the radiation 350 emitted directly into the cone angle of relay lens 210. Thus, if the surface emissivity of the substrate is 0.9, then from equation (1), the surface reflectivity is 1−0.9=0.1. The effective emissivity due to recycling, the emitted radiation using recycling optical system 400 therefore becomes 0.9+0.9(0.1)=0.99.

This example assumes that the transmission of the recycling optical system 400 is perfect, and that there is no scattering by the substrate. However, it is clear that recycling optical system 400 improves the effective emissivity, albeit not quite to the ideal case of unity. In this regard, it is desirable to have as high a transmission in the recycling system as possible.

LTP Maximum Temperature

As alluded to above, one of the major concerns in performing LTP is the variation in maximum temperature $T_{MAX}$ generated along the length of image 100. Successful execution of LTP calls for each point on the substrate surface to experience substantially the same maximum temperature. A variation in the maximum temperature of more than 1 or 2 percent may in certain circumstances be unacceptable. Adjacent scans of image 100 over substrate surface 72 are typically overlapped so the allowable variation in maximum temperature is not exceeded. The maximum separation allowable between adjacent scans depends on the temperature profile of image 100 formed by LTP beam 50. Typically, the profile of image 100 has a relatively uniform central region that defines the working portion of the image, surrounded by a relatively sharp drop off. If the temperature profile of image 100 changes in such a way that the separation between scans should be altered to achieve the desired allowable maximum temperature variation, then corrective action should be taken immediately to avoid improper processing the substrate and a product yield loss.

Thus, another important function provided by temperature measurement apparatus 10 is real-time temperature uniformity monitoring and control. This involves employing a linear array of temperature probes, such as that illustrated in FIG. 2, to measure the temperature variation along the length of the laser beam image. These temperature samples can then be employed to estimate the length and the position of the useable, uniform portion of image 100. In an example embodiment, an alarm is used to alert users of the LTP system when the useable portion of image 100 falls short of some threshold value.

Radiation Beam Stability

Another important concern is the stability of the position of image 100. Rapid changes in the beam position can be caused by turbulence in the gas immediately above the substrate, or instabilities in the laser pointing direction. Such movement leads to non-uniform heating and is difficult to sense directly. However, in an example embodiment, an array of fibers with a field of view that spans the length of the heated zone on the wafer is used to measure the distribution of maximum temperatures along the length of the heated zone. Any movement of image 100 along the fiber array results in a change in the temperature distribution sensed by the fiber array. In this case, the spatial distribution of temperature is used to define an image position. Limits may then be set on the rate at which the image position is allowed to change from the predicted position. An alarm is triggered if the position changes at a rate or by an amount that exceeds a threshold value. The comparison of the measured image position to the predicted position is easily handled by the programmable controller, which in an example embodiment, calculates new positions of image 100 with a frequency of at least 10 Hz. Optimally, the calculation frequency equals at least 60 Hz, 100 Hz, or 1000 Hz. The present invention provides a simple, accurate, non-contact temperature measurement apparatus with the speed and spatial resolution required for real-time control of a scanning-based LTP system. The optical fiber link between the optical relay in optical system 200 and the spectrometer or bandpass filters provides a great deal of flexibility by allowing temperatures to be measured in a wide variety of positions chosen to suit a particular task. The optical fiber link also permits very efficient coupling to the spectrometer so one axis of a photodetector array corresponds to sample position along the beam image, while the other axis corresponds to wavelength.

The conversion of the spectral intensity data for a particular point on the substrate surface is rapidly converted to a temperature reading by means of processing electronics, such as a FPGA, that makes full use of all the available information, and is well adapted to carry out the temperature calculation algorithm as described above. The temperature measurement system is adapted to provide one or more of: a maximum measured temperature, $T_{MAX}$, final temperatures, $T_F$, for each sampled surface point, the beam length over which a given temperature uniformity is achieved, the central position of the temperature distribution, the rate of change of the central position, and changes in the position of image 100 used to irradiate the substrate surface. Each of these parameters should be within a tight specification during LTP to sustain a high yield of IC products embodied in the substrate. The system is capable of providing high-frequency (e.g., greater than 1 kHz) temperature measurements, which can be used to control variations in the LTP process.

Variations of the invention will be apparent to those of ordinary skill in the art upon routine experimentation in view of the disclosure contained herein. For example, while the invention has been described in detail for applications involving P-polarized radiation near Brewster's angle, the invention is not limited to such applications.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Any aspects of the invention discussed herein may be included or excluded as appropriate. Furthermore, since numerous modifications and changes will readily occur to those of skill in the art, it is not desired to limit the invention to the exact construction and operation described herein. Accordingly, other embodiments are within the scope of the appended claims.

All patents, patent applications, and publications mentioned herein are hereby incorporated by reference in their entireties to the extent consistent with the description of the invention as set forth above.

What is claimed is:

1. An apparatus for processing a substrate at a desired maximum temperature, comprising:
    a radiation source adapted to emit a photonic beam of a beam intensity;
    an optical system adapted to form from the beam an image on a substrate at an incident angle of at least 45°;
    a stage adapted to scan the substrate across the beam image to heat the substrate surface;
    a temperature monitoring means for analyzing p-polarized radiation of at least three different wavelengths emitted from a substrate location containing the beam image to generate a probable maximum temperature value at the imaged location;
    an output error signal generator that compares the probable maximum temperature value with a preset desired maximum temperature to generate an output error signal; and
    a controller operably coupled to the radiation source and the stage, wherein the controller in response to the output error signal is programmed to do at least one of alter the beam intensity and modify the scanning velocity between the stage and the beam to null the output error signal.

2. The apparatus of claim 1, wherein the temperature monitoring means is constructed to collect radiation from a plurality of positions on the heated substrate region.

3. The apparatus of claim 1, wherein the temperature monitoring means includes a collecting lens, a polarizer, one or more fibers each corresponding to a different spatial position within the imaged substrate location, a spectrometer that separates the emitted p-polarized radiation into different wavelengths for each spatial position, and at least one detector for each fiber-wavelength combination.

4. The apparatus of claim 1, wherein the temperature monitoring means includes a collecting lens, a polarizer, one or more fibers each corresponding to a different spatial position within the imaged substrate location, spectral bandpass filters that separate the emitted p-polarized radiation into different wavelengths for each spatial position and at least one detector for each fiber-wavelength combination.

5. The apparatus of claim 3, wherein the temperature monitoring means includes a relay lens and a plurality of fibers in a configuration effective to convey and arrange different samples of radiation emitted from the substrate into each fiber along an entrance slit of the spectrometer.

6. The apparatus of claim 3, wherein each spatial position on the substrate corresponds to an emission of p-polarized radiation of at least three different wavelengths and the probable temperature value for each spatial position is generated from independent temperature estimates calculated from spectral intensities of the at least three different wavelengths of the emissions corresponding to each spatial position.

7. The apparatus of claim 3, wherein the temperature monitoring means measures light intensities of at least three different wavelengths corresponding to each spatial position to estimate the probable temperature value for each corresponding spatial position.

8. The apparatus of claim 1, wherein the probable maximum temperature value is generated from independent temperature estimates calculated from ratios of spectral intensities of the at least three different wavelengths.

9. The apparatus of claim 1, wherein the probable maximum temperature value is generated from a weighted average of independent temperature estimates.

10. The apparatus of claim 1, wherein the probable temperature value is generated from a weighted average of the independent temperature estimates from the signals corresponding to the at least three different wavelengths and the signal ratios corresponding to the at least three different wavelengths for each spatial position.

11. The apparatus of claim 1, wherein the temperature monitoring means includes a field-programmable gate array.

12. The apparatus of claim 1, wherein the output error signal is generated at a rate of at least 100 Hz.

13. The apparatus of claim 1, further comprising a substrate on the stage and comprising a dielectric material having a Brewster's angle, wherein the incident angle corresponds to the Brewster's angle for the substrate material.

14. The apparatus of claim 1, further comprising a retro-reflecting means for redirecting radiation emitted from a heated substrate region back toward the heated substrate region.

15. The apparatus of claim 14, wherein the retro-reflecting means is arranged so some of the redirected radiation is specularly reflected into the temperature monitoring means.

16. The apparatus of claim 14, wherein the retroreflecting means collects radiation emitted from the heated region at similar incidence angles with opposing azimuth angles before redirecting the radiation back toward the heated substrate region.

17. An apparatus for processing a substrate comprising:
a radiation source adapted to emit a photonic beam;
an optical system to form from the beam an image on a substrate;
a stage adapted to scan the substrate across the beam image to heat the substrate surface;
a temperature monitoring means for analyzing p-polarized radiation of at least three different wavelengths emitted from at least two positions along an image to determine temperatures at the at least two locations;
an output error signal generator that makes temperature difference calculations that take into account at least one of a preset desired maximum temperature and a desired minimum temperature with the temperatures determined at the at least two locations to generate an output error signal; and
a controller operably coupled to the radiation source and the stage, wherein the controller, in response to the output error signal is programmed to do at least one of alter the beam intensity and provide a change to the scanning speed between the stage and the beam in a manner so the error output signal is nulled.

18. The apparatus of claim 17, wherein the present desired maximum temperature is less than 1410° C.

19. The apparatus of claim 17, wherein the controller, in response to the output signal is programmed to alter the beam and/or to provide relative movement between the stage and the beam to scan the image across the substrate surface in a manner so all heated portions of the substrate exceeds a lower limit temperature.

20. The apparatus of claim 17, wherein the output error signal generator is programmed to generate an output error signal proportional to the difference between a minimum desired temperature and a lowest of the temperatures determined at the at least two locations.

* * * * *